Oct. 19, 1943.   H. J. KRATZER   2,332,323
CONNECTING ROD ASSEMBLY FOR RADIAL ENGINES OR LIKE OPERATING DEVICES
Filed May 17, 1941
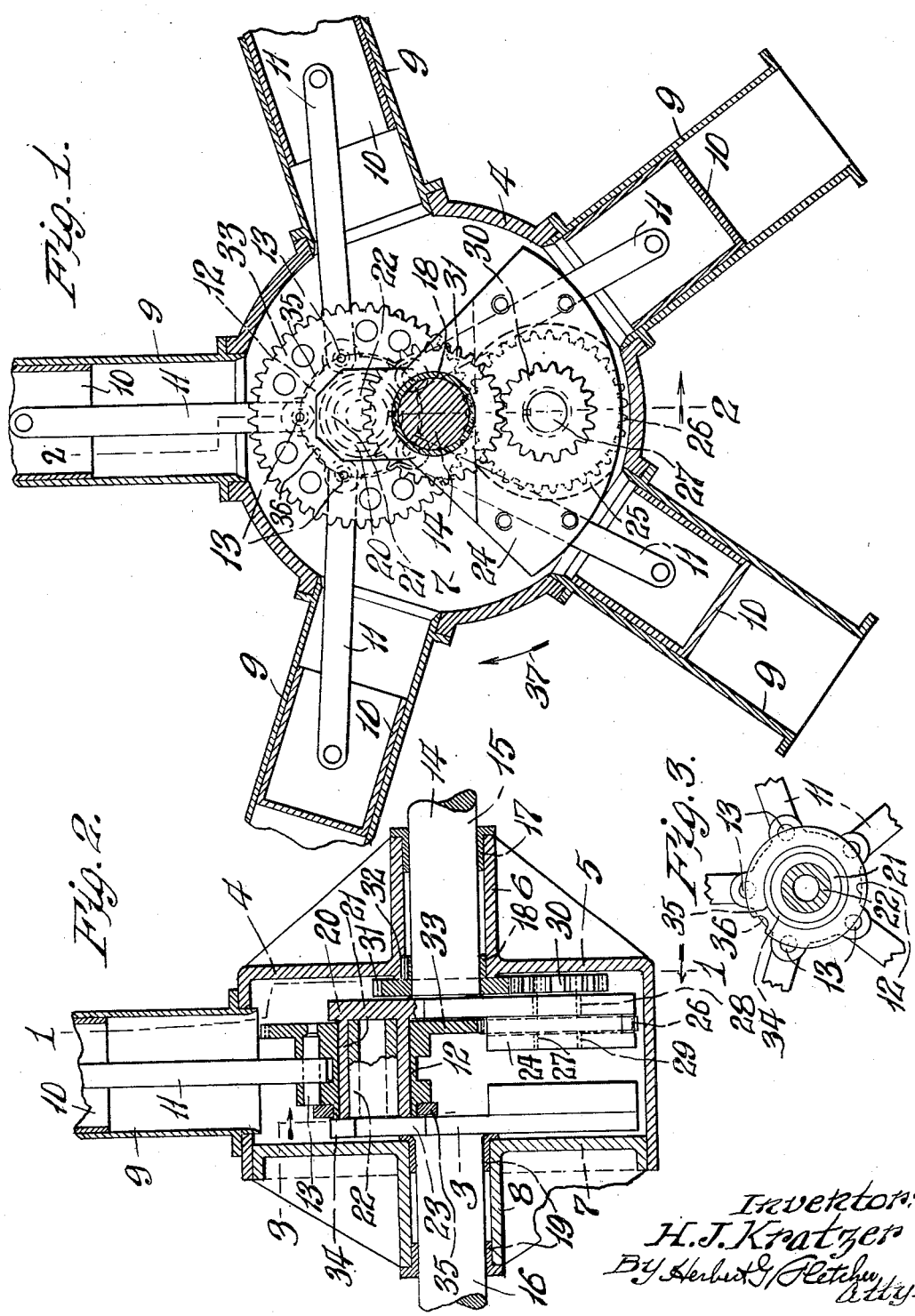
Inventor:
H. J. Kratzer
By Herbert G. Fletcher
Atty.

Patented Oct. 19, 1943

2,332,323

UNITED STATES PATENT OFFICE 2,332,323

CONNECTING ROD ASSEMBLY FOR RADIAL ENGINES OR LIKE OPERATING DEVICE

Herbert J. Kratzer, St. Louis, Mo.

Application May 17, 1941, Serial No. 393,869

18 Claims. (Cl. 74—52)

This invention relates to improvements in connecting rod assembly for radial engines and is a furthering of the improvements in the structure shown in my copending U. S. application filed September 6, 1938, Serial No. 228,500, for providing a synchronizing crank throw bearing.

The principal object of the present invention is to provide an assembly for a piston connecting rod structure to largely serve as counterweight mass for the engine.

Another object is to support certain of the required gearing of the assembly from the counterweight side of the crank shaft.

A further object is to locate the intermediate gearing of the assembly on the crank shaft counterweight.

A still further object is to carry the intermediate gearing of the assembly within the crank shaft counterweight so that its axis can be supported in spaced bearings.

Another still further object is to provide a connecting rod assembly with improved means for simultaneously locking all of the connecting rod pins to the crank throw bearing.

Still another object is to provide an improved connecting rod assembly with a cooperable two-part crank shaft mounting whereby one part of the mounting will telescopingly fit in the other part so that there will be no requirement for any further securance for maintaining the telescoping fitting relation of one part of the crank shaft with the other.

With the foregoing and other objects in view which will appear as the description proceeds, my invention resides in the combination and arrangement of parts and in the details of construction hereinafter described and claimed, it being understood that changes may be made within the scope of what is claimed without departing from the spirit of the invention.

An embodiment of the invention is illustrated in the accompanying drawing, wherein—

Figure 1 is a vertical sectional elevation through a radially cylindered engine taken approximately on the line 1—1 of Fig. 2 and showing the invention applied thereto and as forming a part of the engine.

Figure 2 is a fragmentary transverse sectional elevation taken approximately on the line 2—2 of Fig. 1.

Figure 3 is a fragmentary transverse sectional elevation taken approximately on the line 3—3 of Fig. 2.

Referring by numerals to the accompanying drawing, 4 designates a crank housing having a fixed end wall 5 and a hub 6 projecting outwardly therefrom. Opposed to the wall 5 is a removable end wall 7 having an outwardly extending hub 8 which is in horizontal axial alinement with the hub 6.

Secured to and radially extended from the housing 4 are a series of equally spaced cylinders 9 each having a cooperating piston 10 and a connecting rod 11, the inner end of each rod being connected to a common bearing 12 by means of respective pins 13.

The crank shaft 14 shown, for aiding in the assembly of the engine and/or the connecting rod assembly, is preferably made of two parts wherein the crank shaft axis comprises a pair of axially alined shaft lengths 15 and 16, the shaft length 15 being journaled in a pair of spaced bearings 17 and 18 and the shaft length 16 being journaled in a pair of bearings 19 (Fig. 2).

Integral with the shaft length 15 of the crank shaft 14 and at right angles thereto, is a crank arm 20 and extended therefrom parallel with the shaft length 15, is a hollow crank pin 21 which is telescopingly engaged over a hollow wrist pin extension 22 which is extended from the crank arm 23 of the crank shaft length 16 of the crank shaft.

In opposing disposition to the crank pin 21 on the crank arm 20 is a counterweight 24 which is hollowed at 25 to enclose a gear 26 which is securely fixed to an axis 27 which is disposed parallel to the crank shaft 14, said axis having bearing supports 28 and 29 in the counterweight 24.

One end of the axis 27 extends from the counterweight 24 and securely fixed thereon such as by keying, is a gear 30 in mesh with a ring gear 31 and which ring gear may extend from the bearing 18 and is stationarily fixed by the key 32 which engages the housing 4. This ring gear 31 as shown, is disposed concentric to the axis of the crank shaft 14.

Rigidly secured or formed integral with the end of the bearing 12 which is adjacent the crank arm 20 is a gear 33 which is in mesh with the gear 26 nested in the counterweight 24.

In mounting this improved assembly to form part of a radial engine, the crank shaft length 15 of the crank shaft 14 is engaged within the housing 4 with the crank shaft length 15 seated in its bearings 17 and 18, it of course to be supposed that the intermediate gearing which comprises the gears 26 and 30 having previously been assembled on the counterweight 24, and obviously the gear 30 will be seated in meshing engagement with the stationarily fixed gear 31, The bearing 12 having the fixed gear 33, may be mounted on the crank pin 21 and as the pistons 10 are mounted in respective cylinders, the inwardly extending ends of the connecting rods 11 can each be secured to the bearing 12 by respective pins 13. Obviously, the bearing 12 is properly oriented on the crank pin 21 before the final longitudinal sliding of the bearing on the crank pin meshes its gear 33 with the intermediate gear 26.

The bearing 12 on the opposite side of the gear 33 is provided with a concentric shoulder 34 on which a locking ring 35 is seated, said ring having a notch 36 which when positioned in alinement with the pin holes of the bearing 12, will permit introduction of the pins 13 of respective connecting rods in respective pin holes as the notch 36 of the ring is intermittently positioned in alinement with respective pin holes of the bearing, and when the last pin of the connecting rods has been mounted, the ring is positioned with the notch 36 out of register with any one of the pin holes and locked to the bearing.

The crank shaft length 16 is then mounted in the bearings 19 of the end wall 7 and as the end wall is assembled to the housing 4, care is taken to introduce the wrist pin extension 22 into fitting telescoping engagement with the hollow crank pin 21, the securing of the end wall 7 to the housing holding the two parts of the crank shaft 14 together, with their shaft lengths 15 and 16 in axial alinement without there being any requirement of torsionally tying the two halves of the crank shaft together.

This improved connecting rod assembly provides for the application and use of identical rod connections to all the pistons of a radial engine or pump and the like, and in operation, the crank shaft 14 is revolved in the direction of the arrow 37 in Fig. 1, and as the concentric or ring gear 31 is non-rotatable, as the crank shaft is revolved the counterweight gear 30 and its axis or shaft 27, will be revolved around the crank shaft axis gear 31.

The gear 26 which is also secured to the axis 27 and carried by the counterweight 24 of the crank shaft 14, by reason of being in mesh with the crank pin bearing 12, the amount of rotation imparted to the gear 30 will be carried to the bearing gear 12 in a reverse direction, thereby holding the piston rod pins or connections 13 of the bearing 12 in their original set or oriented positions whereby they will be caused to describe identically true circular orbits in travel, symmetrically centered on respective cylinder axis during each revolution of the crank shaft.

Obviously, the intermediate gears 26 and 30 cooperating between the crank pin bearing gear 33 and the fixed ring or concentric gear 31, will synchronize the revolving of the crank pin bearing 12 in a reverse direction on its crank pin 21 to exactly the same timed speed as the crank shaft 14 is revolved in an opposite or forward direction.

Owing to the properly oriented position of the crank pin bearing 12 being held and maintained during revolving of the crank shaft 14, it is clear that the pistons and rods of respective cylinders will have identical accelerating and retarding movements throughout the continued operation of an engine or device having radially disposed cylinders, and in consequence, uniformly constructed piston rods can be used throughout.

The gearing as shown, is proportioned to provide a one to one ratio; namely, that the bearing gear 33 is turned one revolution on the crank pin when the crank shaft turns one revolution in the engine bearing. With the intermediate gearing disposed within the counterweight, a particular gear train is required and one in which no two of the four gears comprising the train are of like diameter. The mounting the intermediate gearing within the counterweight or 180 degrees away from the crank pin is desirable and important, for the reason that the masses of the two intermediate gears is greater than the gear mounted on the crank pin, thus the entire weight of all the gearing carried by the crank shaft, favorably counterweighs itself.

With further regard to the gear proportions necessary to maintain a one to one ratio when the intermediate gearing is carried on an axis 180 degrees away from the crank pin, it is apparent that the pitch diameter of gear 33 bears the same ratio to gear 26, as does the pitch diameter of gear 31 to that of gear 30. A further obvious requirement is that the sum of the pitch radii of gears 33 and 26, must equal the sum of pitch radii of gears 31 and 30 plus the distance of the crank throw.

The first requisite relating to ratios determines the constant orientation of crank pin bearing, whereas the difference in the sum of the radii of respective pairs of meshed gears must equal one-half of the desired piston stroke.

In addition to the foregoing, it is obvious that the invention also goes to another method of synchronizing the rotation of a crank pin bearing on its crank pin comparable with the revolving of the crank shaft, and while one illustrative embodiment of the invention has been described in detail, it is not my intention to limit its scope to that particular embodiment or otherwise than by the terms of the appended claims.

What I claim is:

1. A connecting rod assembly for radial engines comprising a counterweighted crank shaft having a crank pin bearing with a gear fixed thereon, a fixed gear disposed concentric to the crank shaft axis, and intermediate gearing borne by the counterweight of the crank shaft and meshing with said fixed gears respectively.

2. A connecting rod assembly for radial engines comprising a counterweighted crank shaft having a crank pin bearing with a gear fixed thereon, a fixed gear disposed concentric to the crank shaft axis, and intermediate gearing borne by the counterweight of the crank shaft and meshing with said fixed gears respectively and disposed on a projected radial line therewith.

3. A connecting rod assembly for radial engines comprising a crank shaft having a crank pin and a counterweight opposed therefrom, a pison rod bearing mounted on said crank pin and having a gear fixed to one side thereof, a fixed gear disposed concentric to the crank shaft axis, and intermediate gearing borne by the counterweight of the crank shaft on a projected radial line with said fixed gears and in mesh therewith.

4. A connecting rod assembly for radial engines comprising a crank shaft having a crank pin and a counterweight opposed therefrom, a piston rod bearing mounted on said crank pin and having a gear fixed to one side thereof, a fixed gear disposed concentric to the crank shaft axis, and intermediate gearing borne by the counterweight of the crank shaft on a projected radial line with said fixed gears and in mesh with the near side of respective fixed gears.

5. A connecting rod assembly for radial engines comprising a crank shaft having a crank pin bearing with a gear fixed thereon, a fixed gear disposed concentric to the crank shaft axis, and intermediate gearing borne by the crank shaft and meshing with the near side of respective fixed gears, said intermediate gearing being disposed on a projected radial line from the axis of said fixed gears.

6. A connecting rod assembly for radial engines comprising a crank shaft having a crank pin, a piston rod bearing mounted on said crank pin and having a gear fixed on one side thereof, a fixed gear disposed concentric to the crank shaft axis, and intermediate gearing meshing with said fixed gears and disposed on a projected radial line from the crank pin, said intermediate gearing being mounted on a common axis and having double bearing support on the crank shaft.

7. In combination, a crank shaft having a crank pin and an opposed counterweight, a bearing mounted on the crank pin and having a gear fixedly secured thereto, a fixed gear disposed concentric to the crank shaft axis, and intermediate gearing having double bearing support in the counterweight of said crank shaft and meshing with said fixed gears.

8. In combination, a crank shaft having a crank pin, a bearing mounted on said crank pin having a concentrically disposed gear fixedly secured thereto, a fixed gear disposed concentric to the crank shaft axis, and intermediate gearing borne by the crank shaft and meshing with said fixed gears, said bearing having a series of radially disposed piston rods pinned thereto in equally spaced relation, and a locking ring carried by said bearing for obstructing outward displacement of the pins of said rods from said bearing.

9. In combination, a crank shaft having a crank pin, a bearing mounted on said crank pin having a concentrically disposed gear fixedly secured thereto, a fixed gear disposed concentric to the crank shaft axis, and intermediate gearing borne by the crank shaft and meshing with said fixed gears, said bearing having a series of radially disposed piston rods pinned thereto in equally spaced relation, and a peripherally notched locking ring carried by said bearing for obstructing outward displacement of the pins of said rods from said bearing.

10. In structure of the class described, the combination of a two part crank shaft each having a shaft axis and a crank arm, a hollow crank pin extending from one crank arm, a wrist pin extending from the other crank arm and telescopingly seated in said hollow crank pin, a counterweight on the hollow crank pin arm disposed diametrically opposite therefrom, a piston rod bearing mounted on the crank pin and having a gear fixedly secured thereto, a fixed gear disposed concentric to the crank shaft axis and intermediate gearing borne by the counterweight of the crank shaft and meshing with said fixed gears respectively, said two parts of the crank shaft being mounted together after the gear of the piston rod bearing has been meshed with its respective intermediate gear.

11. A connecting rod assembly for radial engines comprising a counterweighted crank shaft having a crank pin bearing with a gear fixed thereon, a fixed gear disposed concentric to the crank shaft axis, and intermediate gearing borne by the counterweight of the crank shaft and disposed parallel thereto and meshing with said fixed gears respectively.

12. A connecting rod assembly for radial engines comprising a counterweighted crank shaft having a crank pin bearing with a gear fixed thereon, a fixed gear disposed concentric to the crank shaft axis, and intermediate gearing borne by the counterweight of the crank shaft and disposed parallel thereto and meshing with said fixed gears respectively and disposed on a projected radial line therewith.

13. In a radially cylindered device, a crank shaft having a single crank pin and a counterweight, a piston rod bearing mounted on said crank pin and having a spur gear keyed to one end of the bearing in concentric relation thereto, a stationarily held ring gear disposed concentric to the crank shaft axis, and intermediate spur gearing carried by the crank shaft counterweight and meshing with the gear of said bearing and said ring gear.

14. In combination, a crank shaft having a crank pin and an opposing counterweight, a bearing for the crank pin having a concentrically disposed gear fixedly secured thereto, a fixed ring gear disposed concentric to the crank shaft axis, and intermediate gearing borne by the crank shaft counterweight and having axes paralleling the crank shaft and comprising a gear meshing with said gear of the crank pin bearing and a gear meshing with said ring gear.

15. In a radially cylindered device, a crank shaft having a crank arm and a single crank pin, a counterweight on the crank shaft disposed opposite to said crank pin, a bearing mounted on said crank pin and having a gear rigidly secured in concentric relation thereto between the crank arm and the bearing, a stationarily held ring gear disposed concentric to the crank shaft axis, and intermediate gearing paralleling the crank shaft and borne by the counterweight thereof and meshing with the gear of said bearing and said ring gear.

16. A connecting rod assembly for radial engines comprising a counterweighted crank shaft having a crank pin bearing with a fixed gear thereon, a gear fixed disposed concentric to the crank shaft axis, and intermediate gearing borne by the counterweight of the crank shaft and meshing with said fixed gears respectively, all of said gears having different diameters.

17. A connecting rod assembly for radial engines comprising a crank shaft having a crank pin bearing with a fixed gear thereon, a gear fixed disposed concentric to the crank shaft axis, and intermediate gearing borne by the crank shaft and meshing with the near side of respective fixed gears, all of said gears having different diameters, said intermediate gearing being disposed on a projected radial line from the axis of said fixed gears.

18. A connecting rod assembly for radial engines comprising a counterweighted crank shaft having a crank pin bearing with a gear fixed thereon, a fixed gear disposed concentric to the crank shaft axis, and intermediate gearing borne by the counterweight of the crank shaft and meshing with said fixed gears respectively, said gears and said gearing being differently diametered spur gears.

HERBERT J. KRATZER.